E. G. SHORTT.

Shaft-Coupling.

117,823.

Patented August 8, 1871.

Witnesses:

Inventor:
E. G. Shortt.
PER
Attorneys.

UNITED STATES PATENT OFFICE.

EDWARD G. SHORTT, OF CARTHAGE, NEW YORK, ASSIGNOR TO HIMSELF, LEVI WOOD, MINOR GUYOT, A. IRVING STERNBERG, AND GEORGE GILBERT, OF SAME PLACE.

IMPROVEMENT IN SHAFT-COUPLINGS.

Specification forming part of Letters Patent No. 117,823, dated August 8, 1871.

*To all whom it may concern:*

Be it known that I, EDWARD G. SHORTT, of Carthage, in the county of Jefferson and State of New York, have invented a new and Improved Shaft-Coupling; and I do hereby declare the following to be a full, clear, and exact description of the same, reference being had to the accompanying drawing making a part of this specification, in which—

Figure 1:
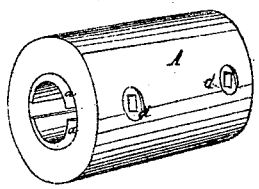
Figure 2:
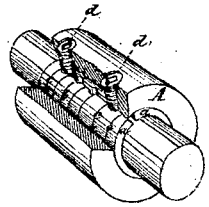
Figure 3:
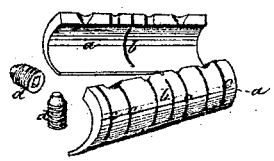
Figure 4:
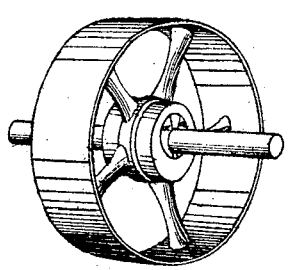
Figure 5:
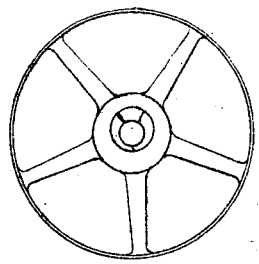

Figure 1 is a perspective view of my invention. Fig. 2 is a perspective view of the same, partly in section, joining two sections of a shaft. Fig. 3 is a perspective view of the wedges and tightening-screws. Fig. 4 is a perspective view of the wedges applied to a shaft for fastening a pulley, and Fig. 5 is an end view of the same.

This invention is an improvement on that for which Letters Patent of the United States No. 95,277 were granted to me September 28, 1869; and consists in forming a transverse slot at the middle of the wedges for the purpose of enabling them to spring and close down upon shafts varying in size in different parts. The invention also consists in transverse grooves made in the backs of the wedges for the purpose of holding tallow to prevent the wedges from rusting or adhering to the inside of the sleeve or tube.

In the drawing, A indicates the sleeve or tube, $a\ a$ the wedges, and $d\ d$ the conical set-screws composing the coupling. $b$ is a transverse slot at the middle of each wedge, said slot running from the point of the wedge nearly to its head, and consequently nearly dividing the wedge into two equal parts.

It is manifest that when pressure is applied to the wedge the narrow strip connecting the two parts will twist all that may be necessary to enable the whole wedge to accommodate itself to parts of the shafts that are of different sizes.

The grooves in the backs of the wedges are shown at $c$; these run entirely across the wedges, and are filled with tallow or other lubricant to prevent the wedges from rusting or adhering to the tubes.

Having thus described my invention, what I claim as new, and desire to secure by Letters Patent, is—

1. The wedge $a$ provided with the slot $b$, as specified.
2. The wedge $a$ provided with the groove $c$, as described.

EDWARD G. SHORTT.

Witnesses:
A. IRVING STERNBERG,
GEORGE GILBERT.